United States Patent
Eggers

(10) Patent No.: US 10,645,067 B2
(45) Date of Patent: May 5, 2020

(54) SEARCH ENGINE FOR AUTHENTICATED NETWORK RESOURCES

(71) Applicant: House of IPY Limited, London (GB)

(72) Inventor: Melanie Jane Eggers, London (GB)

(73) Assignee: House of IPY Limited, London, England (GB)

( * ) Notice: Subject to any disclaimer, the term of this patent is extended or adjusted under 35 U.S.C. 154(b) by 0 days.

(21) Appl. No.: 15/142,756

(22) Filed: Apr. 29, 2016

(65) Prior Publication Data

US 2017/0318001 A1    Nov. 2, 2017

(51) Int. Cl.
*H04L 29/06* (2006.01)
*G06F 17/22* (2006.01)
(Continued)

(52) U.S. Cl.
CPC ............ *H04L 63/08* (2013.01); *G06F 16/951* (2019.01); *G06F 16/9535* (2019.01);
(Continued)

(58) Field of Classification Search
CPC ..... H04L 63/08; H04L 63/1483; H04L 63/10; H04L 63/0884; H04L 2463/102;
(Continued)

(56) References Cited

U.S. PATENT DOCUMENTS 6,629,092 B1    9/2003  Berke
7,698,442 B1    4/2010  Krishnamurthy et al.
(Continued)

FOREIGN PATENT DOCUMENTS

CN    104503983 A    4/2015
CN    104504571 A    4/2015

OTHER PUBLICATIONS

Kiang and Hong, "A Hybrid Phish Detection Approach by Identity Discovery and Keywords Retrieval", Copyright is held by the International World Wide Web Conference Committee (IW3C2). WWW 2009, Apr. 20-24, 2009, Madrid, Spain.
(Continued)

*Primary Examiner* — Alexander Lagor
*Assistant Examiner* — Vu V Tran
(74) *Attorney, Agent, or Firm* — Wood Herron & Evans LLP

(57) ABSTRACT

A method and corresponding computer system for authenticating a network resource are disclosed. The method comprises receiving an input at a computer system over a network, the input comprising a network resource identifier and information indicative of an authentication entity associated with the network resource; automatically identifying stored data using the information indicative of the authentication entity, the stored data comprising contact information associated with the authentication entity; automatically transmitting an electronic message to the authentication entity using the identified contact information, the electronic message providing the authentication entity with the network resource identifier and means for authenticating the network resource; and automatically storing the network resource identifier. A search engine for authenticated network resources and a method and corresponding computer system for authenticating an entity are also disclosed.

20 Claims, 6 Drawing Sheets

(51) Int. Cl.
  *G06F 21/44* (2013.01)
  *G06F 16/9535* (2019.01)
  *G06F 21/64* (2013.01)
  *G06Q 30/00* (2012.01)
  *G06F 16/951* (2019.01)

(52) U.S. Cl.
  CPC ...... *G06F 17/2235* (2013.01); *G06F 17/2247* (2013.01); *G06F 21/44* (2013.01); *G06F 21/64* (2013.01); *G06Q 30/018* (2013.01); *H04L 63/0884* (2013.01); *H04L 63/10* (2013.01); *G06F 2221/2119* (2013.01); *H04L 63/1483* (2013.01); *H04L 2463/102* (2013.01); *H04L 2463/103* (2013.01)

(58) Field of Classification Search
  CPC ....... H04L 2463/103; G06F 2221/2119; G06F 17/2235; G06F 21/14; G06F 21/44; G06F 21/64; G06F 16/951; G06F 16/9535; G06Q 30/018
  See application file for complete search history.

(56) References Cited

U.S. PATENT DOCUMENTS

| | | | |
|---|---|---|---|
| 7,769,820 B1* | 8/2010 | Spies | H04L 63/08 709/218 |
| 8,996,485 B1 | 3/2015 | Krishnamurthy et al. | |
| 2003/0174357 A1* | 9/2003 | Lester | H04N 1/00222 358/1.15 |
| 2011/0055911 A1* | 3/2011 | Adelman | G06Q 10/107 726/7 |
| 2013/0013553 A1* | 1/2013 | Stibel | G06Q 10/107 707/602 |
| 2014/0032378 A1 | 1/2014 | Damnjanovic et al. | |
| 2015/0121484 A1 | 4/2015 | Liu et al. | |
| 2015/0278881 A1 | 10/2015 | Agrawal et al. | |
| 2015/0287099 A1* | 10/2015 | Soundararajan | G06Q 30/0276 705/14.72 |
| 2016/0004857 A1* | 1/2016 | Chen | G06F 21/40 726/3 |
| 2016/0063541 A1 | 3/2016 | Geng et al. | |
| 2016/0112284 A1* | 4/2016 | Pon | H04L 43/045 709/224 |

OTHER PUBLICATIONS

Wang et al., "Verilogo: Proactive Phishing Detection via Logo Recognition", Dept. of Computer Science and Engineering University of California, San Diego, Dec. 6, 2011.

\* cited by examiner

SEARCH ENGINE FOR AUTHENTICATED NETWORK RESOURCES

TECHNICAL FIELD

The invention relates to a search engine for authenticated network resources, and to computer systems and methods for authenticating network resources.

BACKGROUND

Authentication is an important aspect of secure communication over the Internet. In many situations it is important that an Internet user can trust that communications originate from a known and trusted sender, and that the communications between the sender and user are not altered during transit. For example, an Internet user making a purchase over the Internet, or using an Internet banking platform, needs to know that they are communicating with a legitimate entity over a secure connection.

Some known authentication techniques use digital certificates. Digital certificates seek to authenticate an entity, and a communication from the entity, by providing information identifying the entity along with a digital signature of a trusted third party. Trusted third parties are typically certification authorities such as Comodo® and Symantec®, and the validity of the digital signature can be verified using cryptography techniques. If the user trusts the third party and the digital signature can be verified, the user can trust the communication from the entity.

While such authentication techniques are important, in some situations they have limitations. For example, where an Internet user performs a search using a well-known search engine such as Google®, the connection to the search engine may be trusted and secure but the search results may contain hyperlinks to websites or content that are not trusted or not secure. As another example, where an Internet user is making a purchase through an Internet marketplace such as Amazon® or eBay®, it is possible that while the connection with the Internet marketplace is secure and trusted by the Internet user, the entity trading through the Internet marketplace may not be a trusted entity. In these situations, an entity associated with network resources that are not authenticated may use the trust Internet users place in entities that are authenticated to avoid scrutiny. Ultimately, the open nature of the Internet makes this a difficult technical problem to overcome.

SUMMARY OF THE INVENTION

The scope of protection is defined by the independent claims, to which reference should now be made. Advantageous features are set out in the dependent claims.

According to one aspect of the present invention there is provided a method of authenticating network resources. The method comprises: receiving an input at a computer system over a network, the input comprising a network resource identifier and information indicative of an authentication entity associated with the network resource; automatically identifying stored data using the information indicative of the authentication entity, the stored data comprising contact information associated with the authentication entity; automatically transmitting an electronic message to the authentication entity using the identified contact information, the electronic message providing the authentication entity with the network resource identifier and means for authenticating the network resource; and automatically storing the network resource identifier. A corresponding computer system for authenticating network resources is also provided.

This provides the technical advantage of authenticating network resources where conventional authentication techniques are limited. For example, the authentication technique of embodiments of the present invention can be applied where a primary network resource associated with a primary entity is trusted, but a secondary network resource linked from the primary network resource is not trusted. In combination with conventional authentication techniques such as digital certificates and digital signatures, a network user can trust all aspects of communication over a network.

In some embodiments, the network resource is a web page, a computer file, a media file, a mobile app or computer software. In other embodiments, it may be the functionality of hardware available over a network, such as the functionality of a printer. Embodiments of the present invention provide for authentication of all kinds of network resources, and can be applied in Wide Area Networks such as the Internet, where a wide variety of network resources of questionable authenticity are available, or in Local Area Networks, where the authenticity of files, software and hardware appearing on the network may be a particular concern.

The network resource identifier may be a Uniform Resource Identifier (URL), an IP address or a Media Access Control (MAC) address.

The contact information associated with the authentication entity may be an email address, fax number, telephone number, instant message identity, or an identity on an online authentication platform. Transmitting the electronic message may comprise generating and transmitting an email, fax, text message, instant message or a message over an online authentication platform.

The input received at the computer system may further comprise information identifying a second entity, such as an entity associated with the network resource other than the authentication entity, or an entity wishing to have the network resource authenticated before accessing it.

The method may further comprise generating a web page, the contents of the generated web page comprising one or more of the network resource identifier, the information identifying the second entity, and the means for authenticating the network resource. The electronic message may comprise a link to the generated web page.

In some embodiments, the authentication entity is a network administrator, an entity registered with a regulatory body, the owner of a registered trade mark associated with the network resource, a licensee of such a trade mark, an authorized agent of the owner or licensee of the trade mark, or a distributor authorized by the owner or licensee of the trade mark. The contact information associated with the authentication entity may itself have been separately, independently, authenticated. Separately authenticating the contact information association with the authentication entity adds an additional layer of trust and security.

According to another aspect of the present invention there is provided a computer system for implementing a search engine, the computer system comprising at least one computer. The computer system is configured to: store data comprising a plurality of data items, each data item comprising an authenticated network resource identifier; receive search queries over a network; and respond to the search queries by providing authenticated network resource identifiers. A corresponding method is also provided.

A search engine that only returns network resource identifiers that have been authenticated advantageously allows network users the assurance that they can trust communications and transactions with network resources reached through the search engine. Such a search engine also provides a high quality of service, as it only returns network resources that have been deemed authentic by an entity trusted by the network user.

As explained above, the network resource may be a web page, a computer file, a media file, a mobile app, computer software or the functionality of network connected hardware. The network resource identifier may be a URL, IP address or a MAC address.

A method and corresponding computer system for authenticating an entity is also provided.

BRIEF DESCRIPTION OF THE DRAWINGS

The invention will now be further described by way of example only and with reference to the accompanying figures in which.

DETAILED DESCRIPTION

Figure 1:
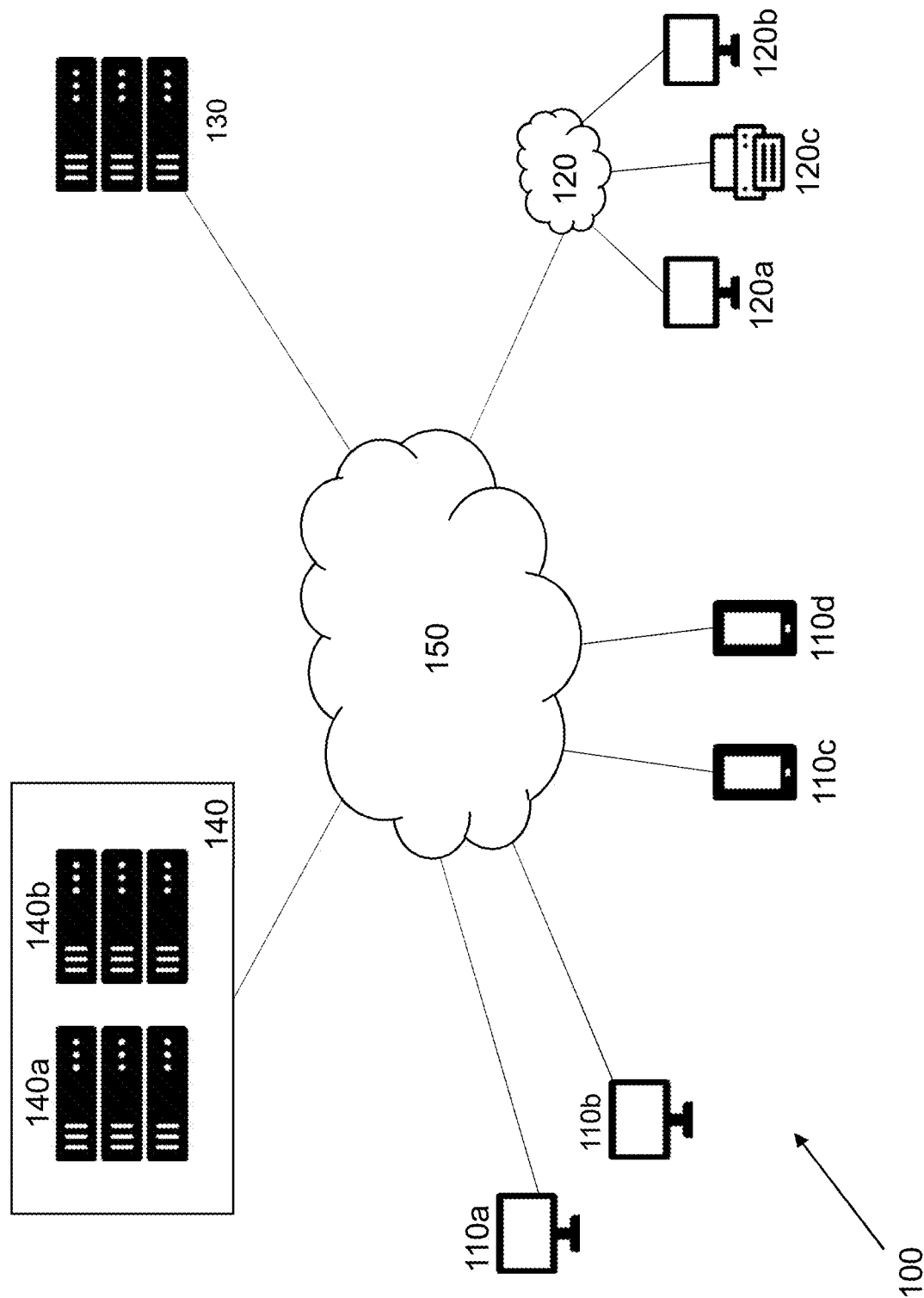
FIG. 1 is a schematic diagram illustrating a computer network in which various network resources are available to network endpoints devices.

FIG. 1 illustrates an example of a computer network 100 in which various network resources are available to network endpoints that are connected together via the network 100.

The computer network 100 includes a Wide Area Network 150, or WAN, such as the Internet. The WAN 150 connects together electronic endpoint devices 110a-d; 120a-c; 130; 140a-b via wired and/or wireless network connections. Data can be transmitted between endpoints over the WAN using a communication protocol such as TCP/IP, as is known in the art, with IP addresses addressing the location of the endpoint devices 110a-d; 120a-c; 130; 140a-b on the computer network 100.

Additionally or alternatively to a WAN 150, the computer network 100 can include one or more Local Area Networks 120, or LANs. A LAN 120 includes a plurality of relatively local endpoint devices 120a-c connected together to form a local network. The endpoint devices 120a-c forming the LAN 120 can communicate with each other over the LAN. If the LAN 120 is also connected to a WAN 150, the electronic devices 120a-c forming the LAN can also communicate with electronic devices outside of the LAN via the WAN.

An endpoint device can be any kind of electronic device able to communicate with other electronic devices over a network 100. For example, endpoint devices include personal computers such as desktop computers 110a-b; 120a-b, laptop computers, smart phones 110c-d and tablet computers, servers 130; 140a-b, smart devices, scanners, printers 120c and the like.

The functionality of the endpoint devices 110a-d; 120a-c; 130; 140a-b may be accessible over the computer network 100. For example, some endpoint devices store data files, and some of these data files can be made available to other endpoint devices over the network 100. In some cases these data files represent web pages that can viewed on an endpoint device using a web browser. In other cases, the data files do not represent web pages, and are instead word processing documents or the like, media content such as video and audio, computer software or a software update, or a mobile app. Other endpoint devices may additionally or alternatively have other kinds of functionality accessible over the computer network 100, such as hardware functionality. For example, an endpoint device may be able to access the functionality of a printer 120c that it is connected over the network 100.

Such functionality, including both hardware functionality of a network endpoint device and data stored on an endpoint device, may be known as a network resource. That is, a network resource may be one or more data files that are stored on one or more network endpoints and that are available to other network endpoints, a subset of the data contained in such files, or the hardware functionality of a network endpoint that is available to other network endpoints.

A network resource is identified by a network resource identifier which typically provides where the network resource is located on the computer network 150 and how it can be accessed. In some cases a network resource identifier is a Uniform Resource Locator (URL). A URL identifies a protocol for accessing a network resource (such as Hypertext Transfer Protocol (HTTP) or File Transfer Protocol (FTP)), a hostname that identifies the location of the host on the network (this may be an IP address, or a name associated with an IP address that can be identified using the Domain Name System (DNS)) and a file name that identifies the location of the network resource at the host. In other cases, a network resource identifier may be a Media Access Control address (MAC address) or the like.

It will be appreciated that the computer network 100 can include one or more servers 130; 140a-b, which may be standalone servers 130 or may be servers that are part of a datacentre 140. According to a client-server model, server devices 130; 140a-b serve requests from client devices. For example, servers may host web pages, computer files, databases and the like, and respond to requests from client devices by providing the web pages for viewing in a browser of the client device, providing files for downloading to the client device or providing content in response to a search query. While many endpoint devices are capable of behaving as both clients and servers, it is typical for certain endpoint devices, such as smart phones and tablets, to behave as clients, while dedicated server devices 130; 140a-b behave as servers. That is, network resources are often associated with dedicated servers 130; 140a-b, with general purpose client devices accessing network resources from dedicated severs, but this is not necessarily the case.

Figure 2:
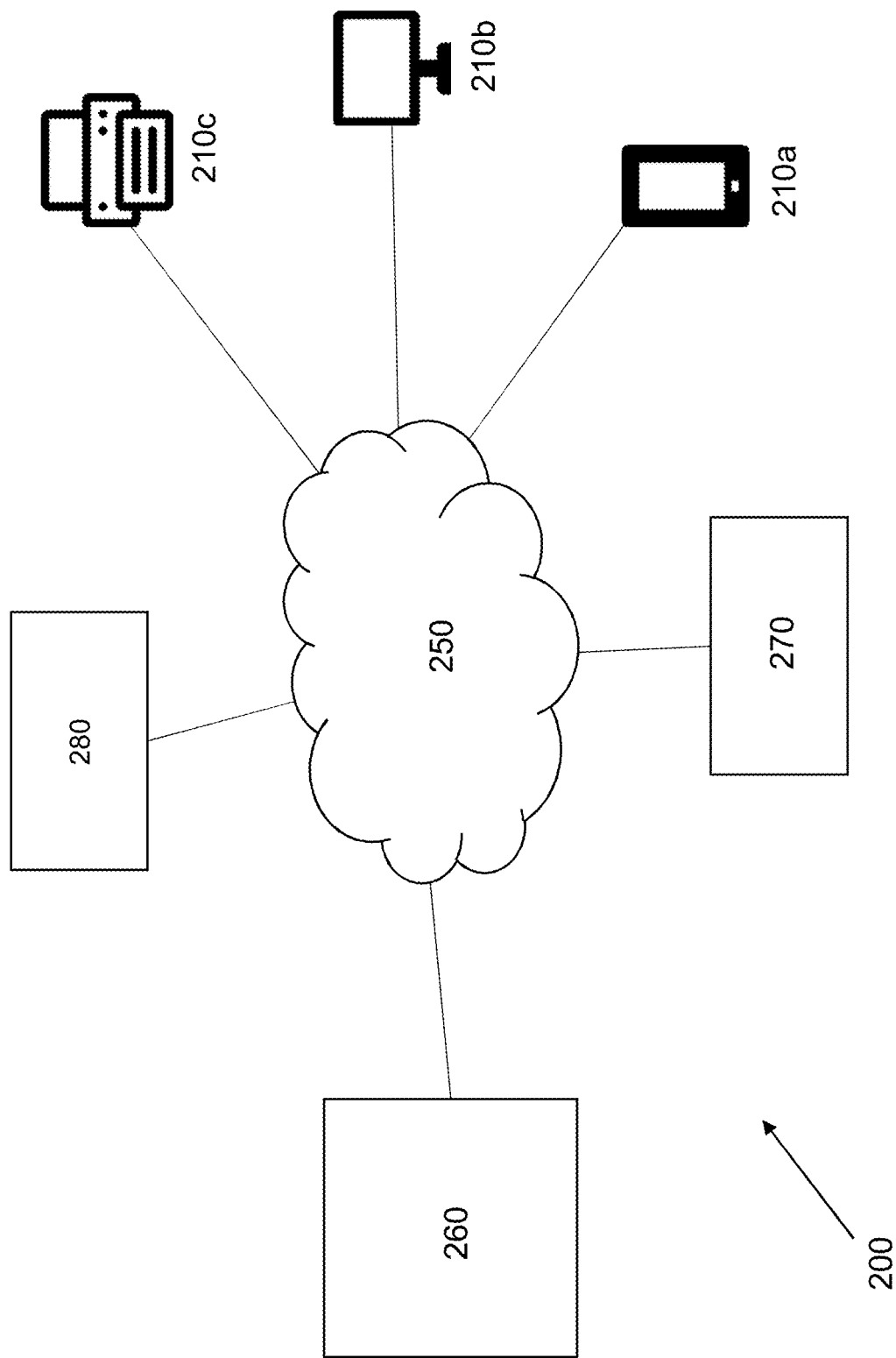
FIG. 2 is a schematic diagram illustrating a computer network that includes a computer system for authenticating a network resource.

FIG. 2 illustrates an exemplary computer network 200 which includes a computer system 260 for authenticating a network resource 270.

As can be seen, the exemplary computer network 200 includes various electronic devices connected via a network 250. It should be appreciated that the network 250 may be a WAN, a LAN or a combination of both WANs and LANs. For convenience, FIG. 2 shows devices connected in a star topology, but it should be appreciated that other network topologies are consistent with the present invention.

The computer network 200 includes network endpoint devices 210a-c that are able to access various network resources, including network resource 270. The network resource 270 may be any network resource, as described above with reference to FIG. 1. For example, the network resource 270 may be a web page hosted on a server. Alternatively, the network resource 270 could be a file such a media file, a word processing file, or a software file or mobile app available for download from a network endpoint. As another alternative, the network resource can be a hardware resource such as a printer.

The computer network 200 also includes a computer system 260 for authenticating network resources such as network resource 270. The computer system 260 for authenticating network resources may be implemented as one or more computers, or may be located on one or more servers in a data centre (not shown). The computer system 260 is able to communicate with other endpoint devices connected via network 250.

The computer network 200 further includes an electronic device 280 associated with a authentication entity. As will be explained in more detail below, an authentication entity is an entity which the computer system 260 is able to automatically identify as being in a position to authenticate a particular network resource 270.

Figure 3:
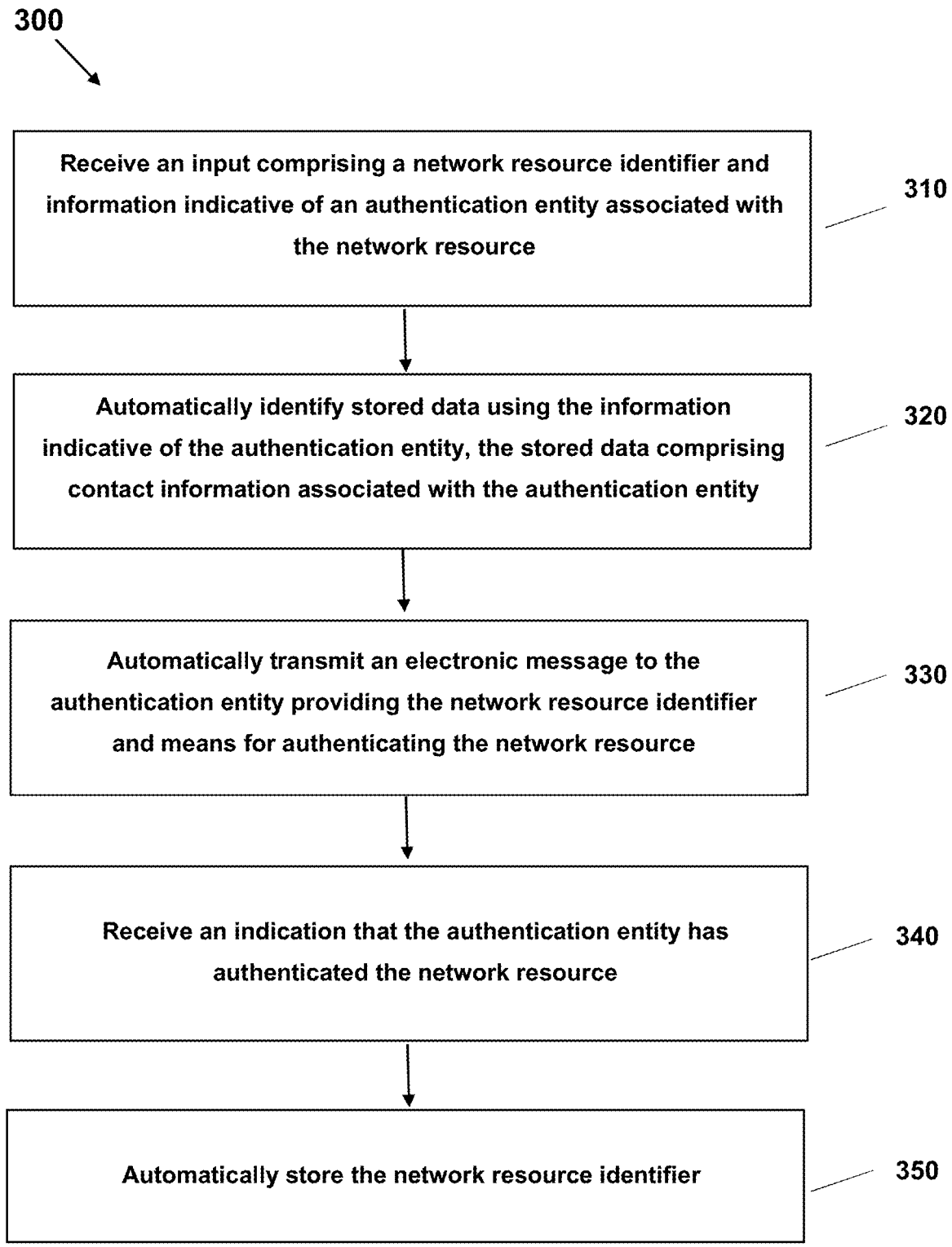
FIG. 3 is a flow diagram illustrating a method of authenticating a network resource.

FIG. 3 illustrates a method of authenticating a network resource in accordance with one aspect of the present invention.

In step 310, a computer system 260 for authenticating a network resource 270 receives an input over a computer network 250 that includes a network resource identifier and information indicative of an authentication entity associated with the network resource.

As explained above with reference to FIGS. 1 and 2, the network resource 270 can be any resource available to network endpoints over the network 250, such as a web page, a mobile app or computer software, or a network printer. The network resource identifier may be a URL that identifies the location of the network resource on the computer network 200, or may be any other information that allows the network resource to be identified, such as an IP address or MAC address.

The input may be received from a network endpoint associated with the network resource 270, such as a network endpoint storing a file that is to be authenticated. Alternatively, the input can be received from a network endpoint that is not associated with the network resource 270, such as endpoint associated with an Internet user who wishes to have a network resource 270 authenticated by an authentication entity before making use of the network resource. The input may be an automatically generated input, or may be made by submitting a request via an online platform to have the network resource 270 authenticated.

The authentication entity is a third-party who is in a position to authenticate the network resource 270 to the satisfaction of network users. The identity of the authentication entity can therefore depend on the application. In some cases, for example where network 250 includes a Local Area Network, it may be necessary to authenticate a network resource for security purposes. In this case, the authentication entity may be a network administrator. In other cases, for example where the network resource 270 is a web page associated with branded products, the authentication entity may be the owner of a registered trade mark associated with the network resource, an authorized licensee of a registered trade mark, or an authorized agent or distributor. In other cases still, the authentication entity may be an entity registered with a regulatory body.

The nature of the information indicative of the authentication entity will also depend on the application and implementation. In one example, where the network resource 270 is a hardware resource such as a printer, such information may be determined from the network resource itself or the network resource identifier. In some embodiments, the information identifies a name, brand or registered trade mark associated with the network resource 270. Such information may be input through an online platform by a user, or may be automatically determined from the network resource. For example, where the network resource 270 is a web page or other network resource containing text, information identifying a registered trade mark may be automatically determined from the text, or from metadata even where there is no text.

Optionally, the input further comprises information identifying a second entity. The second entity may be the source of the input and/or an entity associated with the network resource other than the authentication entity. For example, where the network resource is a web page, an entity associated with the web page may wish to have the web page and/or its contents authenticated by the authentication entity. In this case, it may be helpful for the authentication entity to be aware of the claimed identity of the entity associated with the web page. In another example, the second entity may be a LAN associated with the network resource, and the information identifying the second entity may be an IP address associated with the LAN.

In step 320, the computer system 260 automatically identifies stored data that comprises contact information associated with the authentication entity using the information indicative of the authentication entity.

In some embodiments, the computer system 260 stores data indicative of authentication entities in association with contact information for the authentication entities. This way, the computer system 260 can automatically identify the contact information using the information indicative of the authentication entity. In other embodiments, the computer system 260 may not store such data, and may instead automatically identify data stored elsewhere. For example, where the information indicative of the authentication entity identifies a registered trade mark, the computer system 260 may automatically identify contact information from an official, online register of trademarks hosted on one or more servers connected via network 250.

The contact information associated with the authentication entity may be any contact information that allows the authentication entity to be contacted, but is preferably information that allows them to be contacted electronically. For example, the contact information may be an e-mail address, fax number, telephone number, or a user identity on an online platform for authenticating network resources. However, the contact information can be any other kind of information, including a postal address.

The contact information associated with the authentication entity is preferably itself authenticated. For example, the contact information may be information from a trusted or official source, or may have been provided by the authentication entity itself in an authenticated manner, as described in more detail below with reference to FIGS. 5 and 6, for example.

In step 330, the computer system 260 automatically transmits an electronic message to the authentication entity using the identified contact information, the electronic message providing the authentication entity with the network resource identifier and means for authenticating the network resource.

In some embodiments, where the contact information is an email address, the computer system 260 automatically generates and transmits an email to the email address. In other embodiments, the computer system automatically generates and transmits a fax, an instant message, text message or a message on an online platform for authenticating network resources.

It is also contemplated that where the contact information is a mobile or landline phone number, the computer system may automatically initiate a telephone call, rather than automatically transmit an electronic message. Likewise, where the contact information is a postal address, the computer system may automatically generate a letter to be sent by post, rather than automatically transmit an electronic message.

The electronic message may include the network resource identifier. Additionally or alternatively, the electronic message can include a URL linking to a web page automatically generated by the computer system 260, the web page including the network resource identifier.

The authentication entity can use the network resource identifier to determine whether the network resource is authentic. For example, where the network resource is identified by a URL, the authentication entity can follow the URL and determine whether its contents are authentic, or perform other checks, such as security checks, to determine whether the network resource should be authenticated.

The means for authenticating the network resource identifier can be any suitable means. For example, the electronic message may include a URL which, when followed by the authentication entity, automatically authenticates the network resource. Additionally or alternatively, the electronic message may include a URL linking to a web page automatically generated by the computer system 260, the web page including the means for authenticating the network resource. In this case, the means for authentication may be a button which, when pressed or clicked, authenticates the network resource, or an opportunity for the authentication entity to enter predefined credentials, such as a password, to authenticate the network resource.

In step 340, the computer system 260 receives an indication that the authentication entity has authenticated the network resource. For example, the computer system 260 may detect that the authentication entity has authenticated the network resource using the means for authenticating the network resource described above for step 330.

In step 350, the computer system 260 automatically stores the authenticated network resource identifier.

In some embodiments, the computer system 260 automatically stores network resource identifiers in association with other information, such as the identity of the authentication entity, information indicative of the authentication entity and/or information identifying a second entity, where such information is known. For example, the computer system 260 may store authenticated URLs in association with the owner of registered trademarks associated with the URLs, information identifying the registered trademarks, and the like. Storing such information is useful for implementing a search engine for authenticated network resources, as will now be explained with reference to FIG. 4.

Figure 4:
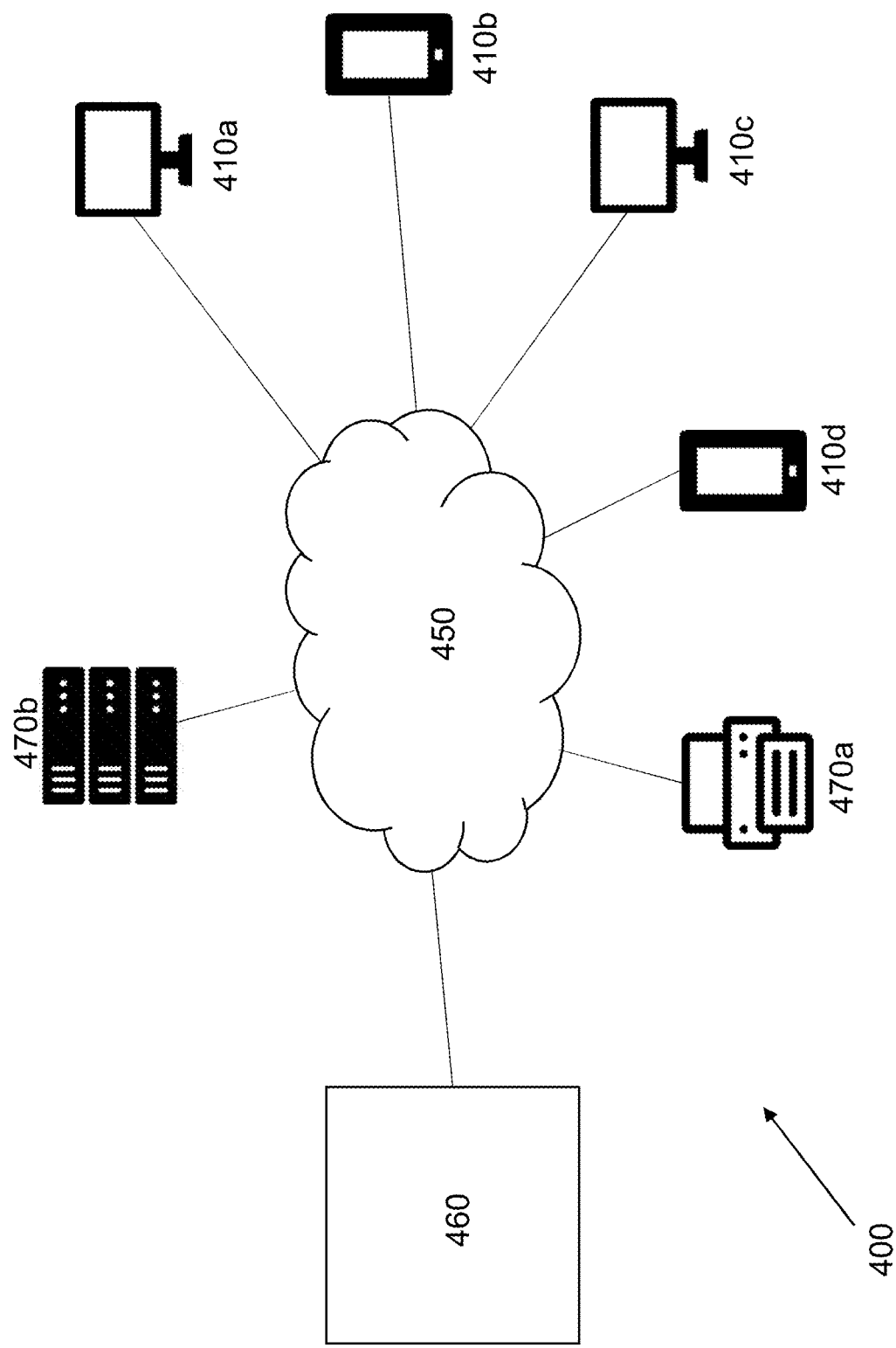
FIG. 4 is a schematic diagram illustrating a computer network that includes a computer system for implementing a search engine for authenticated network resources.

FIG. 4 illustrates an example of a computer network 400 that includes a computer system 460 for implementing a search engine for authenticated network resources.

As can be seen, the exemplary computer network 400 includes various electronic devices connected via a network 450. It should be appreciated that the network 450 may be a WAN, a LAN or a combination of both WANs and LANs. For convenience, FIG. 4 shows devices connected in a star topology, but it should be appreciated that other network topologies are consistent with the present invention.

The computer network 400 includes network endpoint devices 410a-d that are able to access various network resources, including network resources 470a-b. The network resources 470a-b may be any kind of network resource, as described above with reference to FIG. 1. For example, a network resource may be a web page hosted on a server 470b. Alternatively, a network resource could be a file such a media file, a word processing file, or a software file or mobile app available for download from a server 470b. As another alternative, a network resource can be a hardware resource such as a printer 470a.

The computer network 400 also includes a computer system 460 that implements a search engine for authenticated network resources. The computer system 460, which may be one or more computers, or may be located on one or more servers in a data centre, is able to communicate with endpoint devices 410a-d connected on the network 400. The computer system 460 that implements the search engine for authenticated network resources may be the same computer system as or form part of the computer system 260 for authenticating network resources, described above with reference to FIGS. 2 and 3. Alternatively, it may be a separate computer system.

The computer system 460 that implements the search engine stores information including network resource identifiers corresponding to network resources that have been authenticated as described above with reference to FIGS. 1 to 3. The computer system 460 also receives search queries from network endpoints 410a-d, and responds to the search queries by providing authenticated network resource identifiers. In some embodiments, the computer system 460 also hosts an online platform through which a user of a network endpoint 410a-d can submit a search query and receive the search results.

As noted above, the computer system 460 may store the network resource identifiers in association with other information. For example, the network resource identifiers can be stored in association with one or more of: keywords, the identity of the authentication entity that authenticated the network resource, or the information indicative of the authentication entity. Such information can be used to identify one or more network resource identifiers that should be provided in search results in response to a search query.

In one example, authenticated network resource identifiers that correspond to network resources with hardware functionality, such as printers, may be stored in association with a keyword such as "printer", and information such as a name given to a printer, an IP address of a LAN on which the printer is located, or the network name given to the LAN. In response to a search query specifying relevant information, the computer system 460 returns relevant network resource identifiers. For example, the computer system 460 may return network resource identifiers corresponding to printers located on a LAN that have been authenticated by a network administrator of the LAN.

In another example, network resource identifiers such as URLs are stored in association with information identifying one or more registered trademarks, brands associated with the registered trademarks, and/or keywords associated with the registered trademarks or brands. In response to a search query specifying, for example, a registered trade mark, the computer system can provide authenticated URLs relating to that registered trade mark that have been authenticated by the owner of the registered trade mark.

Figure 5:
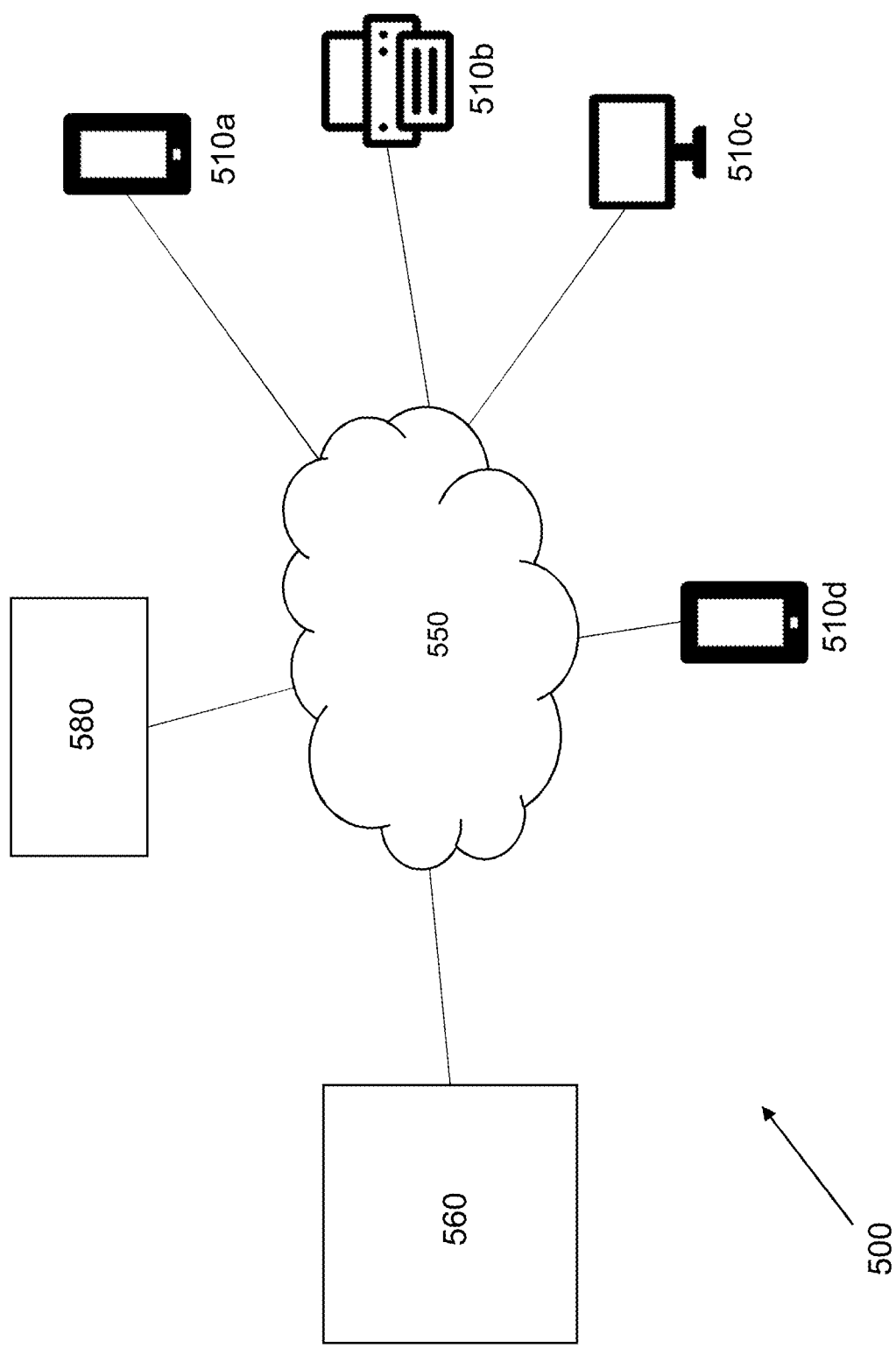
FIG. 5 is a schematic diagram illustrating a computer network that includes a computer system for authenticating an entity.

FIG. 5 is a schematic diagram illustrating a computer network 500 including a computer system 560 for authenticating an entity's credentials.

Like exemplary computer networks 200 and 400 described above, the exemplary computer network 500 includes various electronic devices connected via a network 550. It should be appreciated that the network 550 may be a WAN, a LAN or a combination of both WANs and LANs. For convenience, FIG. 5 shows devices connected in a star topology, but it should be appreciated that other network topologies are consistent with the present invention.

The exemplary network 500 also includes a computer system 560 for authenticating the credentials of an entity, such as an entity associated with network device endpoint 580. Computer system 560 is able to communicate with network device endpoint 580 over the network 550 using a communication protocol such as TCP/IP. The computer system 560 for authenticating the credentials of an entity may be the same computer system as or form part of the computer systems 260, 460 described above with reference to FIGS. 2 and 4, or may be a separate computer system.

Figure 6:
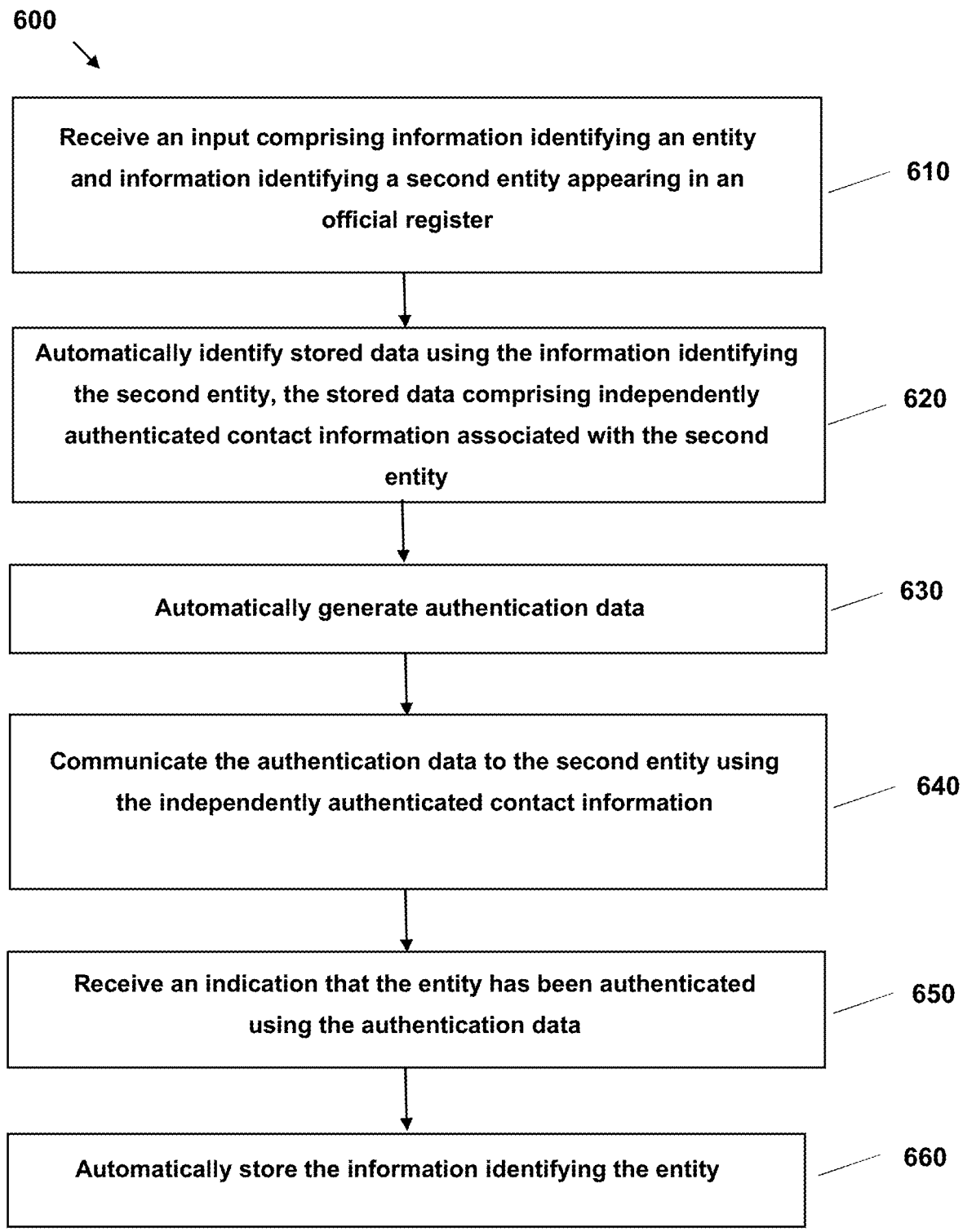
FIG. 6 is a flow diagram illustrating a method of authenticating an entity.

FIG. 6 is a flow diagram illustrating a method 600 of authenticating an entity's credentials. It should be appreciated that such a method can be used in combination with the method of authenticating a network resource described above with reference to FIG. 3. In particular, the entity described below with reference to FIG. 6 may be an authentication entity in accordance with FIG. 3, and the contact information associated with the authentication entity in the method described above with reference to FIG. 3 may be authenticated using the method illustrated in FIG. 6, although this is not essential.

In step 610, a computer system 560 for authenticating an entity's credentials receives an input over a computer network 550 that includes information identifying the entity and information identifying a second entity appearing in an official register.

The second entity may, in some cases, be the owner of a registered trade mark, a licensee of a registered trade mark, or an authorized agent who acts on behalf of an owner or licensee of a registered trade mark. In this case, the information identifying the second entity may include information identifying a registered trade mark.

In other cases, the second entity may be a company that appears in an official register of companies, or an entity registered with a recognized or regulatory body. For example, the second entity may be an entity registered with a financial or legal service regulatory body, such as the Financial Services Authority (FSA) or Solicitor Regulation Authority (SRA) in the United Kingdom. As another example, the input may include a registration number for a regulatory body such as the Medicines and Healthcare products Regulatory Agency (MHRA) in the United Kingdom. It should be appreciated that these are merely examples, and other kinds of regulatory body could be used, in any jurisdiction. In these cases, the information identifying the second entity may include a name, registration number or a registration reference corresponding to the second entity in the official register.

The input is received from an electronic device 580 associated with the entity and may, for example, have been submitted using a platform for authenticating the credentials of entities. Where the input includes a registered trade mark, the registered trade mark may be a registered trade mark which the entity claims to own, or for which the entity claims to be associated with. For example, the entity may claim to act on behalf of the owner of the registered trade mark, be a licensee of the registered trade mark, or be an authorized distributor. In other embodiments, where the input includes other information such as a registered company name and/or number, or a name, number and/or reference for a regulatory body, the entity may claim to be or act on behalf of the registered company or the entity registered with the regulatory body.

The information identifying the entity can be any information, but may preferably be an email address or other means for contacting the entity, preferably using an electronic message.

In step 620, the computer system 560 automatically identifies stored data using the information identifying the second entity, the stored data comprising independently authenticated contact information associated with the second entity.

In some embodiments, the computer system 560 stores information identifying registered trademarks, company names and/or numbers, or numbers, names and/or references for a regulatory body, in association with independently authenticated contact details. This way, the computer system 560 can automatically identify the contact information using the input information.

In other embodiments, the computer system 560 may not store such data, and may instead automatically identify independently authenticated contact information stored elsewhere. For example, in response to receiving the input comprising information identifying the registered trade mark, company name or the like, the computer system 560 may automatically identify data stored in an official register of trademarks, an official register of companies, or an official register of a regulatory body.

In some embodiments, at a time prior to receiving the input in step 610, the computer system may have automatically identified and stored information, including the contact information, from an official register such as an official register of trademarks, of companies or of a regulatory body.

The contact information can be any kind of contact information. For example, it may be a postal address, an email address, a fax number, a mobile telephone number or a landline telephone number. The contact information may be the address for service, or equivalent, identified in an official register.

In step 630, the computer system 560 automatically generates authentication data. The nature of the authentication data can depend at least in part on the application, but may be an authentication number, code, hyperlink or the like.

In step 640, the authentication data is communicated to the second entity using the identified contact information. The manner in which the authentication data is communicated can depend on the nature of the identified contact information. In some embodiments, the computer system 560 automatically generates an electronic message such as an email, instant message or text message that includes the authentication data and transmits the electronic message. Where the contact information is a fax number, the computer system 560 may automatically generate and send a fax. In other cases, where the identified contact information is a postal address, the computer system 560 may automatically generate a letter that includes the authentication code, and the letter can then be sent to the postal address. In other cases still, where the contact information is a telephone number, the computer system may automatically initiate a telephone call. The call may be initiated between the contact telephone number and an automated system, the automated system providing the opportunity to authenticate the entity using selectable options. Alternatively, the call may be initiated between the contact telephone number and a human.

The authentication data is therefore communicated to the independently authenticated contact details, such as the address for service identified on an official register, and not to contact information provided by the entity to be authenticated. This way, the entity to be authenticated will only have access to the authentication data if they are associated with the independently authenticated contact details of the second entity. If the entity is associated with the authenticated contact details, and therefore receives the authentication data, they can use the authentication data to authenticate themselves. However, if the entity falsely claims to be associated with the second entity, they will not receive the authentication data, and will not be able to authenticate themselves.

In step 650, the computer system 560 receives an indication that the entity has been authenticated using the authentication data. For example, where the authentication data is sent by an electronic message, the entity may enter an authentication number into an online platform, or click a hyperlink in an email they receive. Alternatively, where the entity receives a telephone call, they may authenticate themselves using selectable options, or by communication with a person who can input to the computer system that the entity has been authenticated.

In step 660, the computer system 560 automatically stores the information identifying the entity. That is, the computer system 560 stores information identifying the entity input in step 610, as this information has now been authenticated.

In some embodiments, the computer system 560 automatically stores the information identifying the entity in association with other information, as described above with reference to FIGS. 3 and 4. Such information may be useful for implementing the search engine described above with reference to FIG. 4.

Embodiments of the present invention may be particularly advantageous for authenticating goods and services sold on online marketplaces, where counterfeiting can be a problem. Additionally, embodiments may be particularly advantageous for verifying the authenticity of websites and platforms providing video and audio media, computer software, mobile apps and the like, and verifying the authenticity of the content, where piracy of media and software or provision of insecure content can also be problem.

Consumers of goods and services, as well as media and software, cannot always easily tell the difference between legitimate an illegitimate offerings over the Internet, partly because they cannot inspect the offerings before they access, download or buy the offerings. Further, the Internet makes it easier for illegitimate entities operating online to establish an air of legitimacy that they can use to trick Internet users. It is relatively cheap and easy for a fraudulent seller to obtain a domain name, build a website, include web advertising from legitimate operators on their website, and establish a social media presence, all of which may give them the appearance of a legitimate entity.

Illegitimate online entities have additional tools at their disposal. For example, by offering their products and services through legitimate online marketplaces such as Amazon®, eBay® and Alibaba®, consumers will often extend their trust in these websites to the products and services offered through them, without applying the level of scrutiny they usually would. Such entities can also use techniques such as search engine optimization to appear high up in search engine results, as Internet users will often assume that URLs that appear high up in search engine results link to the websites of legitimate entities. As another example, illegitimate entities may sell advertisement space on their websites to unwitting legitimate ones. Internet users seeing an advertisement linking to the website of a legitimate entity are more likely to assume the host website is also legitimate.

Known supply-side measures tend not to be effective against these problems. Legitimate entities may apply anti-counterfeiting devices such as holograms to their products, but since online users cannot inspect products before purchasing them, this is ineffective. Legitimate entities can also acquire web domains which may otherwise be used fraudulently, or launch website, online marketplace and social media takedowns on illegitimate entities. However, illegitimate entities can quickly and easily regroup after such takedowns. Ultimately, the fact that the Internet is open and available to all makes it difficult to prevent the participation of illegitimate users.

In accordance with some embodiments of the present invention, websites and content offered by websites can be authenticated by the owner of registered trademarks, or by trusted suppliers of goods or services that are registered with official bodies such a regulatory bodies, before being added to a search engine database. For example, a third-party who legitimately offers branded products through its own website, or through an online marketplace, can have URLs authenticated by the trade mark owner. Likewise, a third-party offering content, such as media content, software or mobile apps may have its content and its websites authenticated by a relevant brand owner. Since the authentication entities such as the owners of the registered trademarks or entities registered with regulatory bodies can be authenticated using the authentication methods described above with reference to FIGS. 5 and 6, and URLs can be authenticated using the authentication methods described above with reference to FIGS. 2 and 3, Internet users can be sure that URLs returned by the search engine will only link to the authentic websites of authentic sellers and to authentic content. In combination with known techniques such as digital certificates and digital signatures, an Internet user can trust the entirety of an online transaction.

Embodiments of the present invention may be implemented using an online platform.

One aspect of such an online platform is a search engine for authenticated products, content and the like for Internet users. A user of the platform can perform one or more of a natural language search, a search for a product, a search for a brand, or a search for a registered trade mark. For a natural language search, a user can enter free text into a text box, as in most conventional search engines. Searches based on products, brands or registered trademarks may also be based on free text, or may involve the user selecting from a predetermined list, for example using a drop-down list. The platform delivers one or more relevant, authenticated, URLs in response to the search query.

Another aspect of such an online platform is a platform for the owners of the registered trademarks and/or regulated providers of goods and services, who act as authentication entities. Brand owners, for example, sign up to the platform by creating a user account. They then provide details of registered trademarks that they own, and for which they wish to act as authentication entity. Before they can act as authentication entities they must be authenticated as being, or being associated with, the owner of the registered trademarks in question, in accordance with the method of authentication described above with reference to FIGS. 5 and 6.

Another aspect of such an online platform is a platform for third parties who wish to offer products, services and content associated with a registered trade mark or regulated provider over the Internet, and who wish to have their web pages and content authenticated so that it appears in the search results of the search engine. Third parties can sign up to the platform by creating a user account. They can then submit URLs to the platform along with information identifying the brands or registered trademarks the URLs are associated with. The URLs can then be authenticated by the owners of the relevant registered trademarks, in accordance with the method of authentication described above with reference to FIGS. 2 and 3. In order to streamline the authentication process, the platform may generate authentication codes or the like that the owner of a registered trade mark can provide to a third party so that they can authenticate their own URLs. This would be advantageous where, for example, a particular third party is particularly trusted by the owner of a registered trade mark.

Embodiments of the present invention have been described. It will be appreciated that variations and modifications may be made to the described embodiments that are within the scope of the present invention.

The invention claimed is:

1. A method of authenticating a network resource, the method comprising:
   receiving an input from a requesting entity at a computer system over a network, the input comprising a network resource identifier associated with a first entity and information indicative of a name of an authentication entity that is to be used to authenticate the network resource, the identity of the authentication entity being different from the identity of the first entity, the identity of the authentication entity being different from the identity of the requesting entity, and the authentication entity being one of a plurality of different authentication entities for which the computer system stores data comprising contact information;
   automatically identifying contact information associated with the authentication entity using the information indicative of the name of the authentication entity that is to be used to authenticate the network resource, wherein the contact information is identified from stored data for a plurality of different authentication entities;
   automatically transmitting an instant message to the instant message identity of the authentication entity using the identified contact information, the instant message providing the authentication entity with the network resource identifier and means for authenticating the network resource;
   receiving an indication that the authentication entity has authenticated the network resource; and
   automatically storing the network resource identifier.

2. A method according to claim 1 wherein the input received from the requesting entity at the computer system further comprises information identifying the first entity.

3. A method according to claim 1 wherein the network resource identifier is a Uniform Resource Locator (URL).

4. A method according to claim 1 wherein the network resource identifier is a Uniform Resource Locator (URL), an IP address or a MAC address.

5. A method according to claim 1 wherein the network resource is a web page, a computer file, a media file, a mobile app or computer software.

6. A method according to claim 1 wherein the network resource is the functionality of hardware available over a network.

7. A method according to claim 2 further comprising:
   generating a web page comprising one or more of the network resource identifier, the information identifying the first entity, and the means for authenticating the network resource.

8. A method according to claim 7 wherein the instant message comprises a link to the generated web page.

9. A method according to claim 1 wherein the authentication entity is an owner of a registered trade mark associated with the network resource.

10. A method according to claim 1 wherein the authentication entity is a licensee of a registered trade mark associated with the network resource, or an agent or distributor authorized by the owner of a registered trade mark associated with the network resource.

11. A method according to claim 1 wherein the contact information has been separately authenticated.

12. A method according to claim 9 wherein the information identifying the authentication entity is information identifying the registered trade mark.

13. A method according to claim 1 wherein the authentication entity is an entity registered with a regulatory body.

14. A method according to claim 9 wherein the input received from the requesting entity at the computer system further comprises information identifying a second entity, the second entity being an entity associated with the network resource but that is not the owner of the registered trade mark.

15. A computer system for authenticating a network resource, the computer system comprising:
   at least one computer comprising a processor coupled to a memory, and operating under the control of software stored in said memory and configured to cause the computer to:
   receive an input from a requesting entity over a network, the input comprising a network resource identifier associated with a first entity and information indicative of a name of an authentication entity that is to be used to authenticate the network resource, the identity of the authentication entity being different from the identity of the first entity, the identity of the authentication entity being different from the identity of the requesting entity, and the authentication entity being one of a plurality of different authentication entities for which the computer system stores data comprising contact information;
   automatically identify stored data contact information associated with the authentication entity using the information indicative of the name of the authentication entity that is to be used to authenticate the network resource, wherein the contact information is identified from stored data for a plurality of different authentication entities;
   automatically transmit an instant message to the instant messaging identity of the authentication entity using the identified contact information, the instant message providing the authentication entity with the network resource identifier and means for authenticating the network resource;
   receive an indication that the authentication entity has authenticated the network resource; and
   automatically store the network resource identifier.

16. A computer system for implementing a search engine, the computer system comprising:

at least one computer comprising a processor coupled to a memory, and operating under the control of software stored in said memory and configured to cause the computer to:

store data comprising a plurality of data items, each data item comprising an authenticated network resource identifier;

receive search queries over a network; and respond to the search queries by providing authenticated network resource identifiers, wherein the network resources corresponding to the respective network resource identifiers have been authenticated by an associated authentication entity according to the method of claim 1.

17. A computer system according to claim 16 wherein each data item further comprises one or more of a keyword, the identity of the authentication entity that authenticated the network resource, or the information indicative of the authentication entity.

18. A computer system according to claim 16 wherein each data item further comprises information identifying a registered trade mark associated with a corresponding network resource.

19. A computer system according to claim 16 wherein the network resource identifier is a Uniform Resource Locator (URL).

20. A computer system according to claim 16 wherein each respective network resource is a web page, a computer file, a media file, a mobile app or computer software.

* * * * *